(12) United States Patent
Sargazikoosheh

(10) Patent No.: US 11,370,517 B2
(45) Date of Patent: Jun. 28, 2022

(54) BATTERY AND PERFORMANCE OPTIMIZATION MODE FOR MARINE MOTOR OPERATION

(71) Applicant: NAVICO HOLDING AS, Egersund (NO)

(72) Inventor: Masoud Sargazikoosheh, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 221 days.

(21) Appl. No.: 16/668,449

(22) Filed: Oct. 30, 2019

(65) Prior Publication Data

US 2021/0129963 A1  May 6, 2021

(51) Int. Cl.
*B63H 21/17* (2006.01)
*B63H 20/00* (2006.01)
*H02J 7/00* (2006.01)

(52) U.S. Cl.
CPC ........... *B63H 20/007* (2013.01); *B63H 21/17* (2013.01); *H02J 7/0047* (2013.01); *H02J 7/0048* (2020.01)

(58) Field of Classification Search
CPC ..... B63H 20/007; B63H 21/17; H02J 7/0047; H02J 7/0048
See application file for complete search history.

(56) References Cited

U.S. PATENT DOCUMENTS

| | | | | |
|---|---|---|---|---|
| 4,872,857 A | * | 10/1989 | Newman | B63B 34/05 440/1 |
| 6,273,771 B1 | * | 8/2001 | Buckley | B63H 21/213 114/144 RE |
| 9,321,516 B1 | * | 4/2016 | Lafreniere | F16D 41/06 |
| 2018/0201354 A1 | * | 7/2018 | Marchio | B63H 20/06 |

OTHER PUBLICATIONS

Meister; "What is Eco Mode and How Does it Work?;" *Car From Japan*; Oct. 15, 2018; retrieved Nov. 14, 2019 from https://carfromjapan.com/article/car-maintenance/how-eco-mode-work/.
Lindquist; "Best Saltwater Trolling Motors 2019—The Ultimate Buyer's Guide;" *What Is 180*; Apr. 4, 2019; retrieved Nov. 14, 2019 from https://www.whatis180.com/best-saltwater-trolling-motors/.

* cited by examiner

*Primary Examiner* — Stephen P Avila
(74) *Attorney, Agent, or Firm* — Nelson Mullins Riley & Scarborough LLP

(57) ABSTRACT

Systems, assemblies, and methods for operating a marine motor are provided herein. An example motor system includes a motor, a battery, and a processor. The processor is configured to receive a user input indicating a desired speed, determine a charge level of the battery, determine an optimized speed or propulsion of the marine motor based on the desired speed and the determined charge level of the battery, and transmit a signal to the motor to operate accordingly. The processor may generate a correction factor based on at least one of the determined charge level of the battery, a boat speed profile curve, and a boat travel distance curve; and determine the optimized speed or propulsion by (Continued)

applying the correction factor to the desired speed. Thus, an eco-mode can be provided to help maintain a high level of battery charge while still enabling desired use.

20 Claims, 13 Drawing Sheets

BATTERY AND PERFORMANCE OPTIMIZATION MODE FOR MARINE MOTOR OPERATION

FIELD OF THE DISCLOSURE

Embodiments of the present disclosure relate generally to battery and performance optimization in motors and, more particularly, to systems and methods for optimizing battery and motor usage for a trolling motor for use on a marine vessel.

BACKGROUND OF THE DISCLOSURE

Motors, such as trolling motors, are often used during fishing or other marine activities. Trolling motors in particular may attach to watercraft and propel the watercraft along a body of water. For example, trolling motors may provide secondary propulsion or precision maneuvering that can be ideal for fishing activities. Trolling motors may also be utilized for the main propulsion system of watercraft.

Motors, such as trolling motors, may include batteries to provide power to the propeller and/or other components of the motor (e.g., displays, steering mechanisms, etc.). Often times, users will need to recharge the battery of the motor prior to utilization of the motor, such as heading out on the water or engaging in other marine activities. Notably, however, battery recharging may take many hours and can lead to user frustration or lost marine activity time.

Applicant has developed systems, assemblies, and methods detailed herein to improve capabilities of trolling motors, which may lead to, for example, reduced battery recharging time and increased time for marine activities.

BRIEF SUMMARY OF THE DISCLOSURE

Typically, marine motors, such as trolling motors, operate at a speed or propulsion set by a user. After the user sets the desired speed or propulsion, the motor may operate accordingly. Notably, however, the set speed or propulsion may not always be necessary for the user to still receive an enjoyable experience. In this regard, the user may unnecessarily be wasting power by operating the motor at an unnecessary speed or propulsion.

The speed or propulsion of a motor may be measured by the rotational speed of the propeller, the thrust or propulsive force applied by the propeller to the water, and/or the power needed to produce the thrust. The resultant thrust and power that the motor produces while operating are closely related to the speed and propulsion set by the user, and variations may occur due to equipment and environmental conditions, for example. As used herein, the set or operating speed or propulsion of a motor may encompass the rotational speed, thrust, propulsive force, and/or power of the motor.

Some embodiments of the present disclosure provide systems, methods, and apparatuses for optimizing performance of the marine motors to limit unnecessary wasting of power, which may lead to reduced battery recharge time. For example, in some embodiments, the marine motor may have a plurality of operating modes, such as a normal mode and an eco-mode. The normal mode may be a sport or turbo mode, for example. In the normal mode, the processor may set the operating speed of the motor directly based on the desired speed set by the user and may allow for maximum performance of the motor. In the eco-mode, the processor may set the operating speed or propulsion of the marine motor based on the charge level of the battery, the actual speed of the boat, the boat profile, and/or other marine data. For example, in some embodiments, a fuzzy controller can be used to determine an optimized speed or propulsion for operating the motor based on the desired speed or propulsion set by the user and various other factors, such as the current battery charge level. While such an optimized speed may be different (e.g., lower) than a user set speed, the user may not notice or may be willing to sacrifice the additional speed to ensure lower power usage. In this way, the battery life and performance of the marine motor may be optimized for the user. This may minimize the amount of time required for charging the battery of the marine motor and allow the user to set out faster—saving the user time in preparation.

In some embodiments, the eco-mode operation of the motor system may be temporarily interrupted. For example, to avoid an object or other hazard a user may wish to quickly turn and/or propel the watercraft at full speed. Thus, the motor system may enable the eco-mode operation to be disrupted in order to operate at full speed. In some embodiments, there may be a turbo mode button or switch provided to the user to activate this temporary mode of operation. Additionally or alternatively, the processor may cause the motor to operate at full speed based on the user's activity (e.g., repeatedly turning a control to full speed).

In some embodiments, rather than operate at a constant determined speed or propulsion in eco-mode, the motor system may enable the marine motor to operate according to a duty cycle. The processor may determine time intervals for operating the marine motor at a maximum and minimum speed or propulsion. For example, the maximum speed may be the desired speed set by the user, and the minimum speed may be zero (e.g., where the motor is off). The processor may determine a duty cycle curve based on the time to accelerate from the minimum speed to the maximum speed, the time to operate at the maximum speed, the time to decelerate from the maximum speed to the minimum speed, and the time to operate at the minimum speed. Moreover, the processor may determine the curvature for the duty cycle curve based on various factors, such as user inputs, boat weight, boat profile, etc. In this way, the processor may control the smoothness of the transitions between speed regimes, and thus, the travel experience of the user.

In one exemplary embodiment, a trolling motor system for use on a marine vessel is provided. The trolling motor system includes a trolling motor assembly, a processor, and a memory. The trolling motor assembly may include a propulsion motor and a battery. The propulsion motor is variable speed and configured to operate at an optimized propulsion in response to an electrical signal. The processor is configured to determine the optimized propulsion based on one or more user inputs. The processor is further configured to generate and transmit the electrical signal corresponding to the optimized propulsion to the propulsion motor. The memory is configured to store a speed profile curve. The one or more user inputs includes a desired operating speed and a selected mode. The selected mode is one of a normal mode and an eco-mode. When the selected mode is the eco-mode, the processor determines the optimized propulsion based on the desired operating speed and a correction factor. The correction factor is generated based on the speed profile curve and a battery charge level of the battery. The correction factor may be generated by a fuzzy controller. The speed profile curve may be updated based on one or more of an actual travelling speed of the trolling motor, a boat type, a boat weight, a weather condition, and a water condition. The correction factor may be generated based on a travel distance curve. The travel distance curve may be updated based on the speed profile curve and a battery type for the battery.

In another exemplary embodiment, a motor system is provided. The motor system includes a motor, a battery, and a processor. The processor is configured to receive a user input indicating a desired speed. The processor is further configured to determine a charge level of the battery and to determine an optimized propulsion based on the desired speed and the determined charge level of the battery. The processor is further configured to transmit a signal to the motor to cause the motor to operate at the determined optimized propulsion. The motor may be a trolling motor. The optimized propulsion may be determined by applying a correction factor to the desired speed. The correction factor may be based the charge level of the battery, a speed profile curve, and/or a travel distance curve. The correction factor may be generated by a fuzzy controller. The motor system may further include a speed sensor configured to determine an actual travelling speed of the motor. The speed profile curve may be updated based on the actual travelling speed of the motor measured by the speed sensor. The speed profile curve may be based on a motor type, a haul weight, and/or an environmental condition. The travel distance curve may be updated based on the speed profile curve and a battery type for the battery. In response to a turbo mode signal received by the processor, the processor may be configured to transmit a turbo signal to the motor to cause the motor to operate at an increased speed. The increased speed may be the desired speed. The turbo mode signal may be transmitted to the processor based on a user activity. The user input may be transmitted to the processor via a user input assembly. The user input assembly may include a foot pedal, a hand control, and/or a remote control.

In another exemplary embodiment, a method of operating a trolling motor is provided. The method includes receiving a user input indicating a desired speed. The method further includes determining a charge level of a battery. The method further includes determining an optimized propulsion based on the desired speed and the charge level of the battery. The method further includes transmitting a signal to the trolling motor to cause the trolling motor to operate at the determined optimized propulsion. The method further includes generating a correction factor based on the determined charge level of the battery, a speed profile curve, and/or a travel distance curve. The optimized propulsion may be determined by applying the correction factor to the desired speed. The method may further include generating the speed profile curve based on an actual travelling speed of the trolling motor, a boat type, a boat weight, a weather condition, and/or a water condition. The method may further include updating the travel distance curve based on the speed profile curve and a battery type for the battery.

In another exemplary embodiment, a trolling motor system is provided. The trolling motor system includes a trolling motor, a battery, and a processor. The processor is configured to receive a user input indicating a desired speed. The processor is further configured to determine a charge level of the battery. The processor is further configured to determine a duty cycle curve based on the desired speed and the determined charge level of the battery. The processor is further configured to transmit a signal to the trolling motor to cause the trolling motor to operate according to the determined duty cycle curve. The duty cycle curve may include an acceleration time interval indicating how long the trolling motor should spend accelerating from a minimum speed to the desired speed. The duty cycle curve may further include a set speed time interval indicating how long the trolling motor should spend operating at the desired speed before decelerating. The duty cycle curve may further include a deceleration time interval indicating how long the trolling motor should spend decelerating from the desired speed to the minimum speed. The minimum speed may correspond to an off state of the trolling motor. The duty cycle curve may further include an off state time interval indicating how long the trolling motor should spend operating in the off state before accelerating. The processor may be further configured to determine the duty cycle curve based on an actual travelling speed, a boat type, a boat weight, a weather condition, a water condition, and/or a current of the trolling motor. The user input may be transmitted to the processor via a user input assembly. The user input assembly may include a foot pedal, a hand control, and/or a remote control.

BRIEF DESCRIPTION OF THE DRAWINGS

Figure 1:
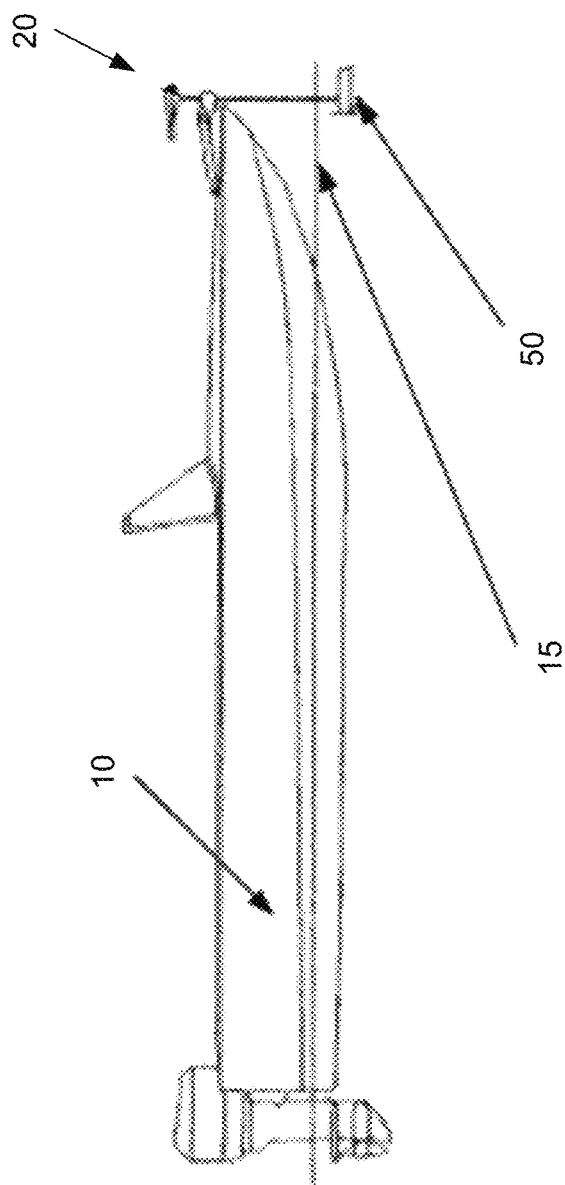
Figure 2:
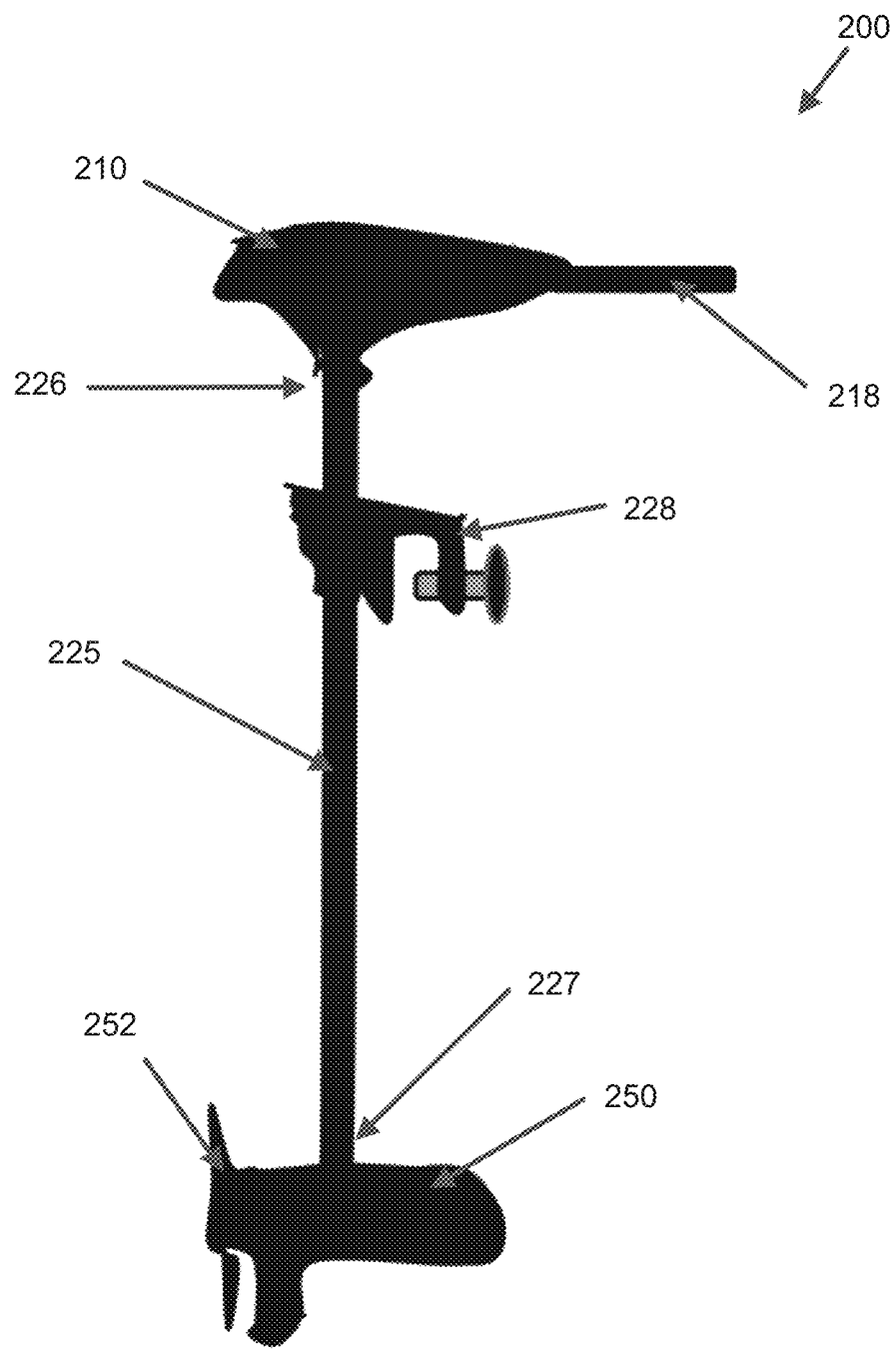
Figure 3:
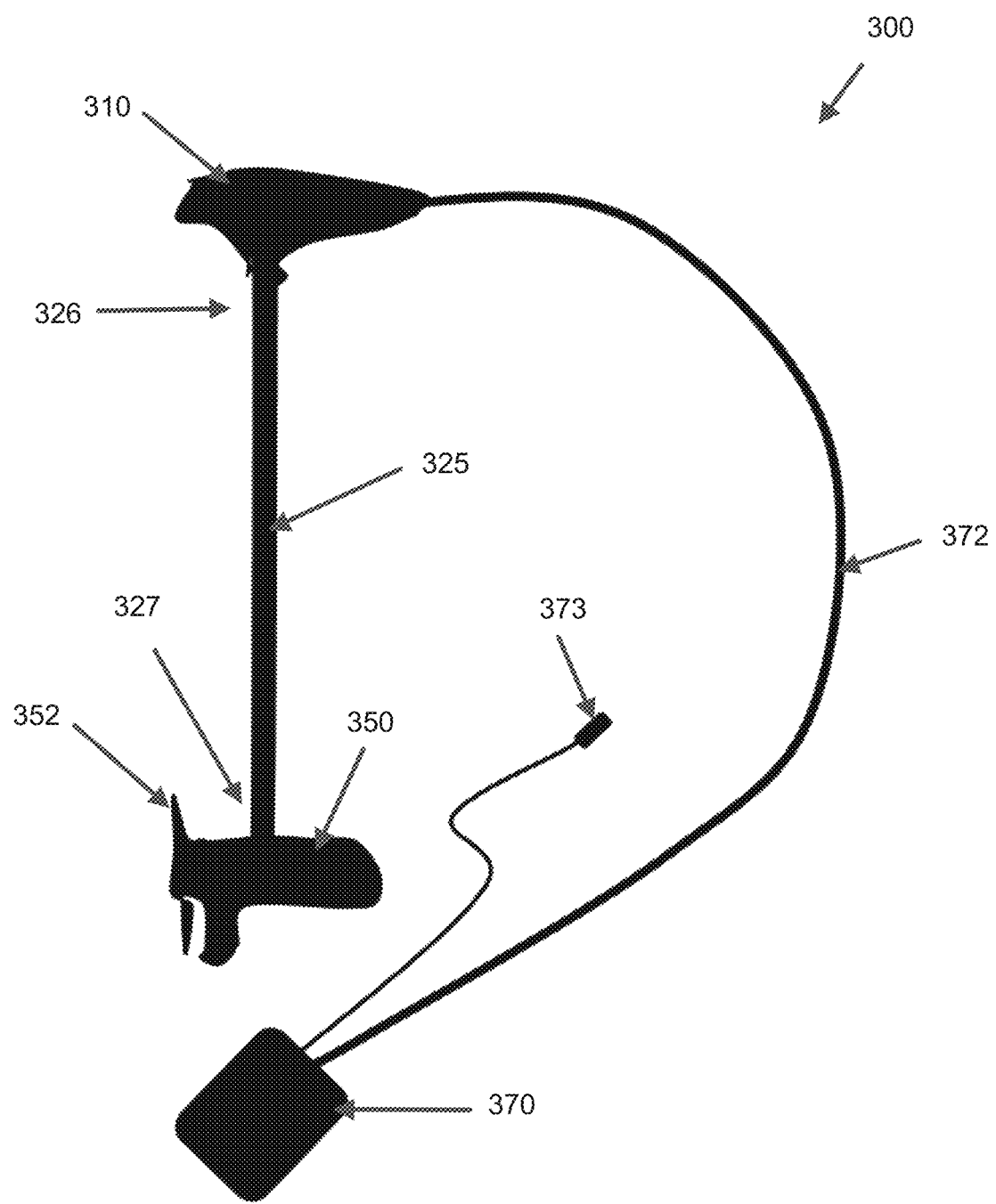
Figure 4:
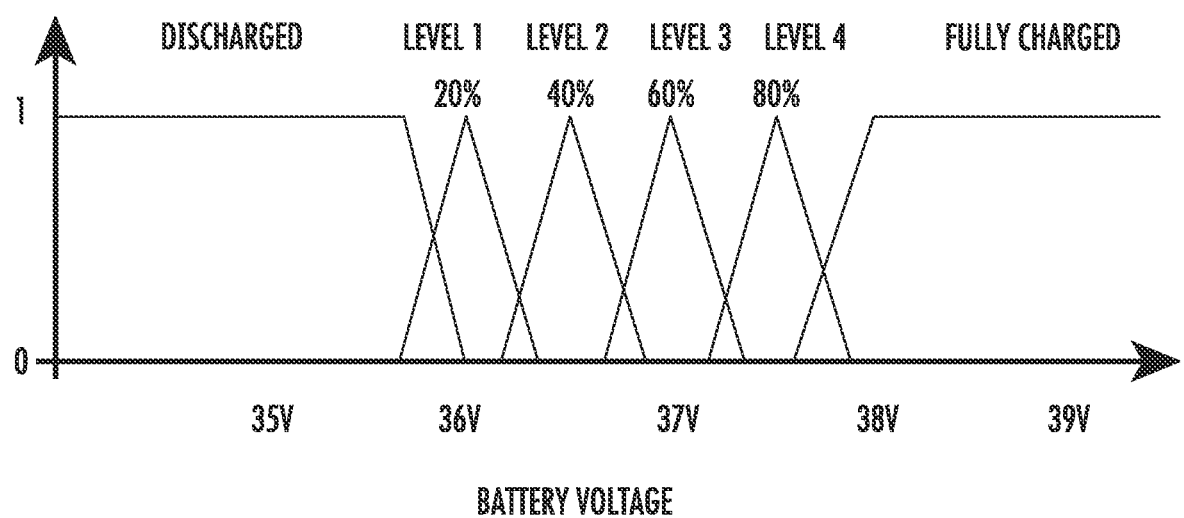
Figure 5:
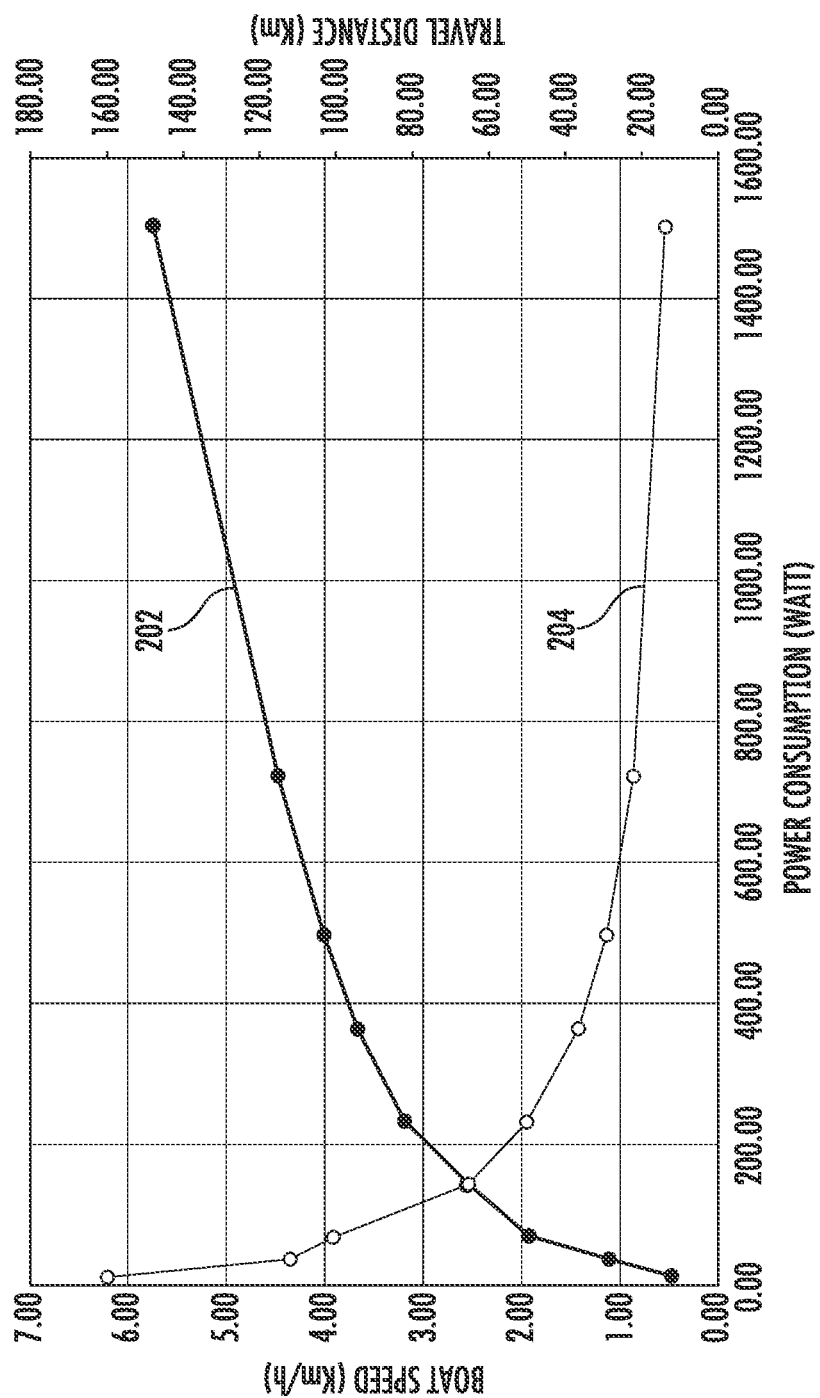
Figure 6:
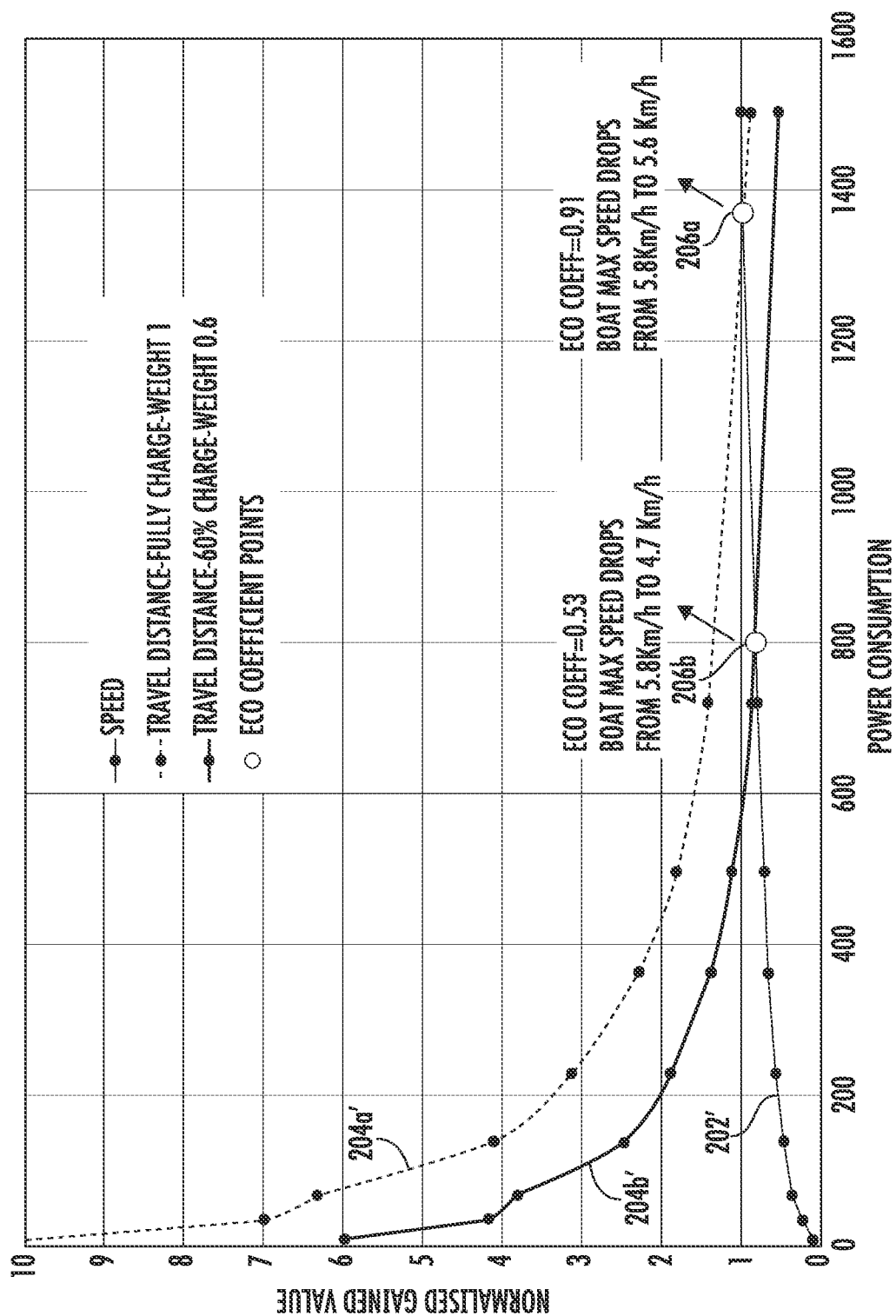
Figure 7:
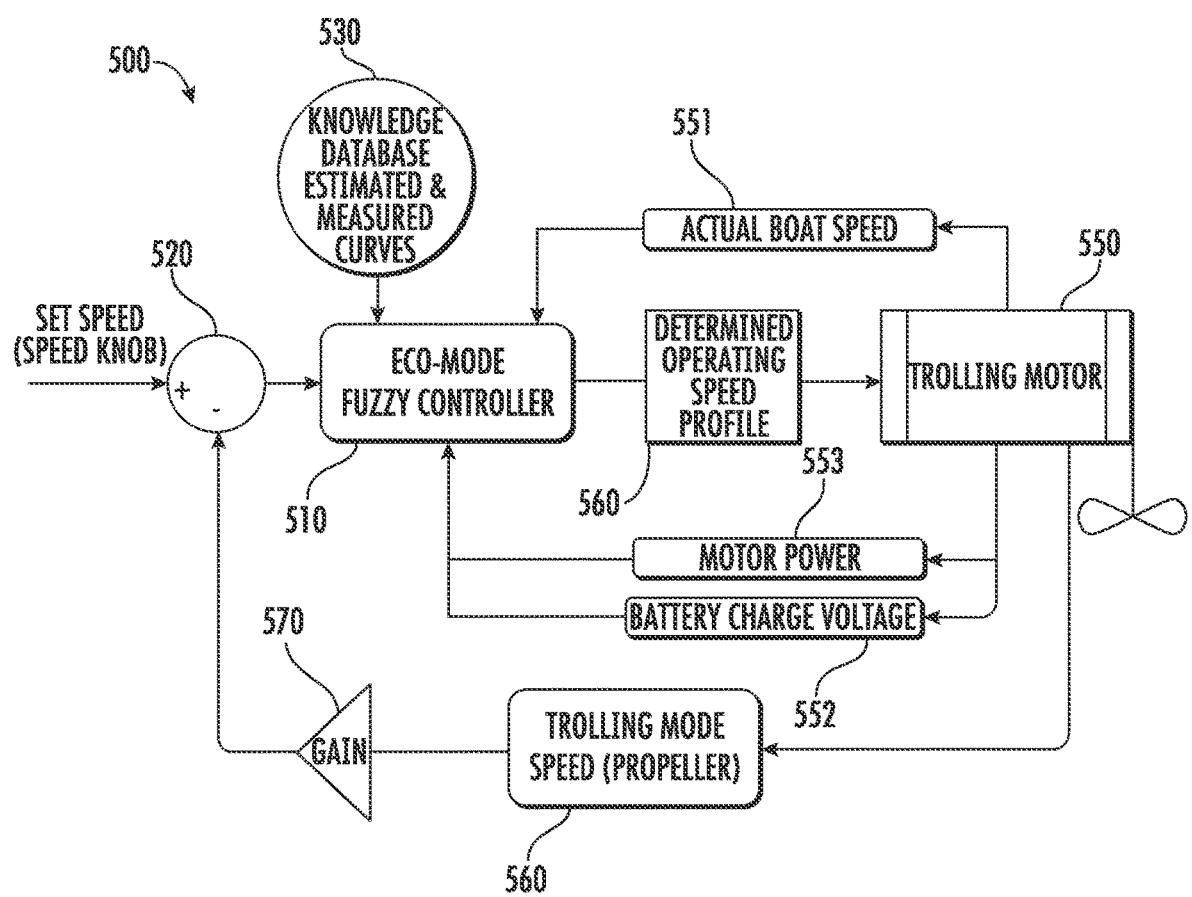
Figure 8:
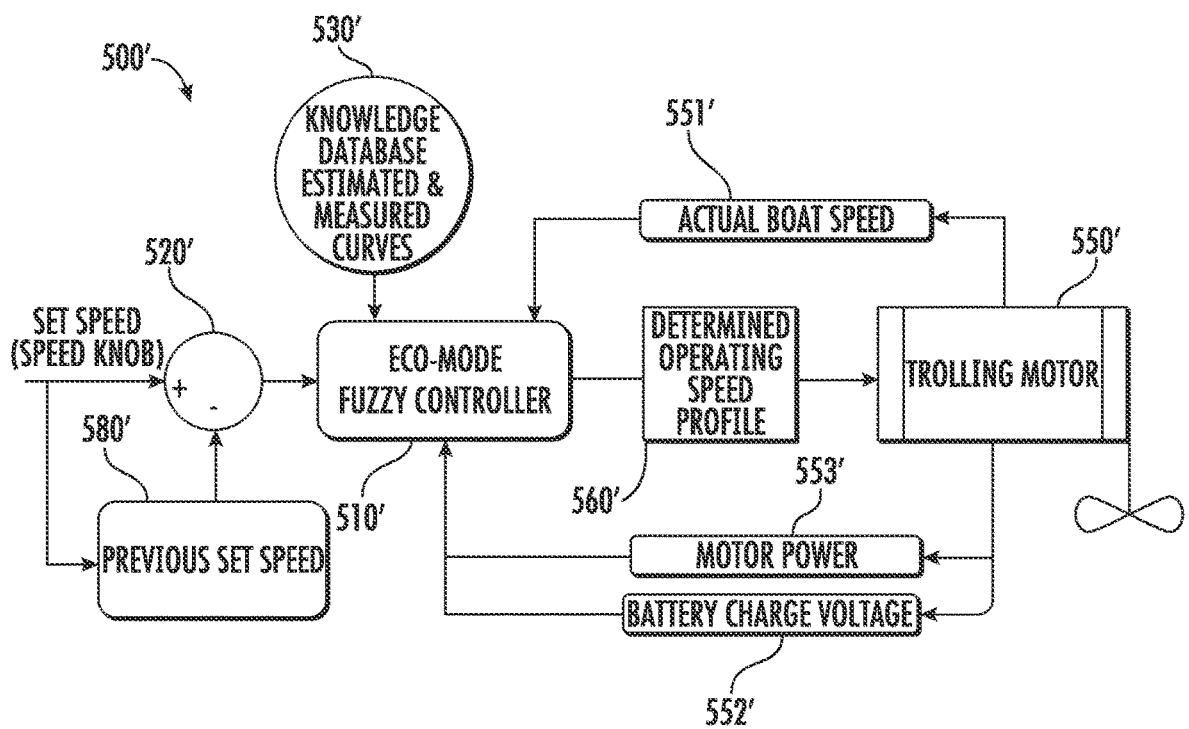
Figure 9:
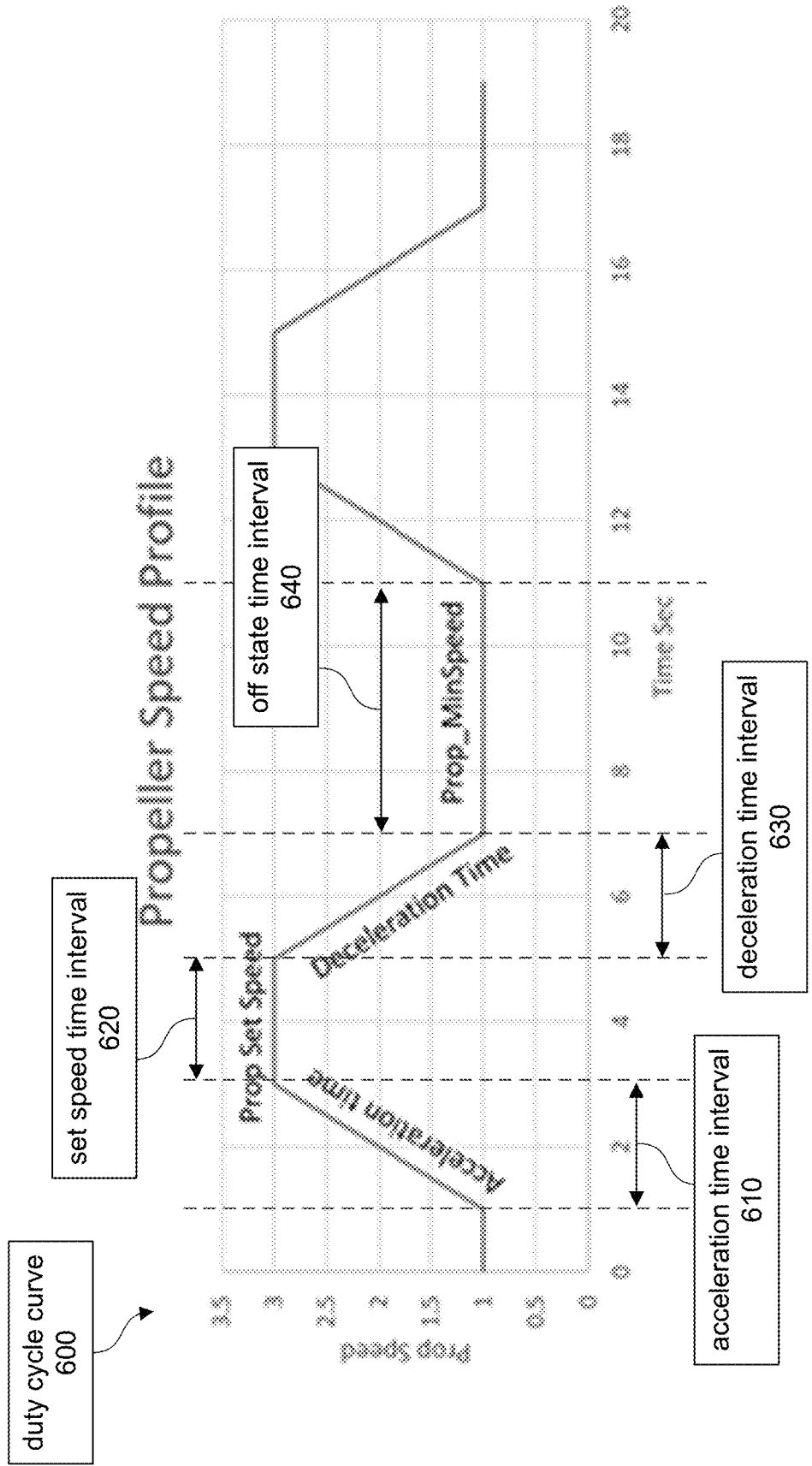
Figure 10:
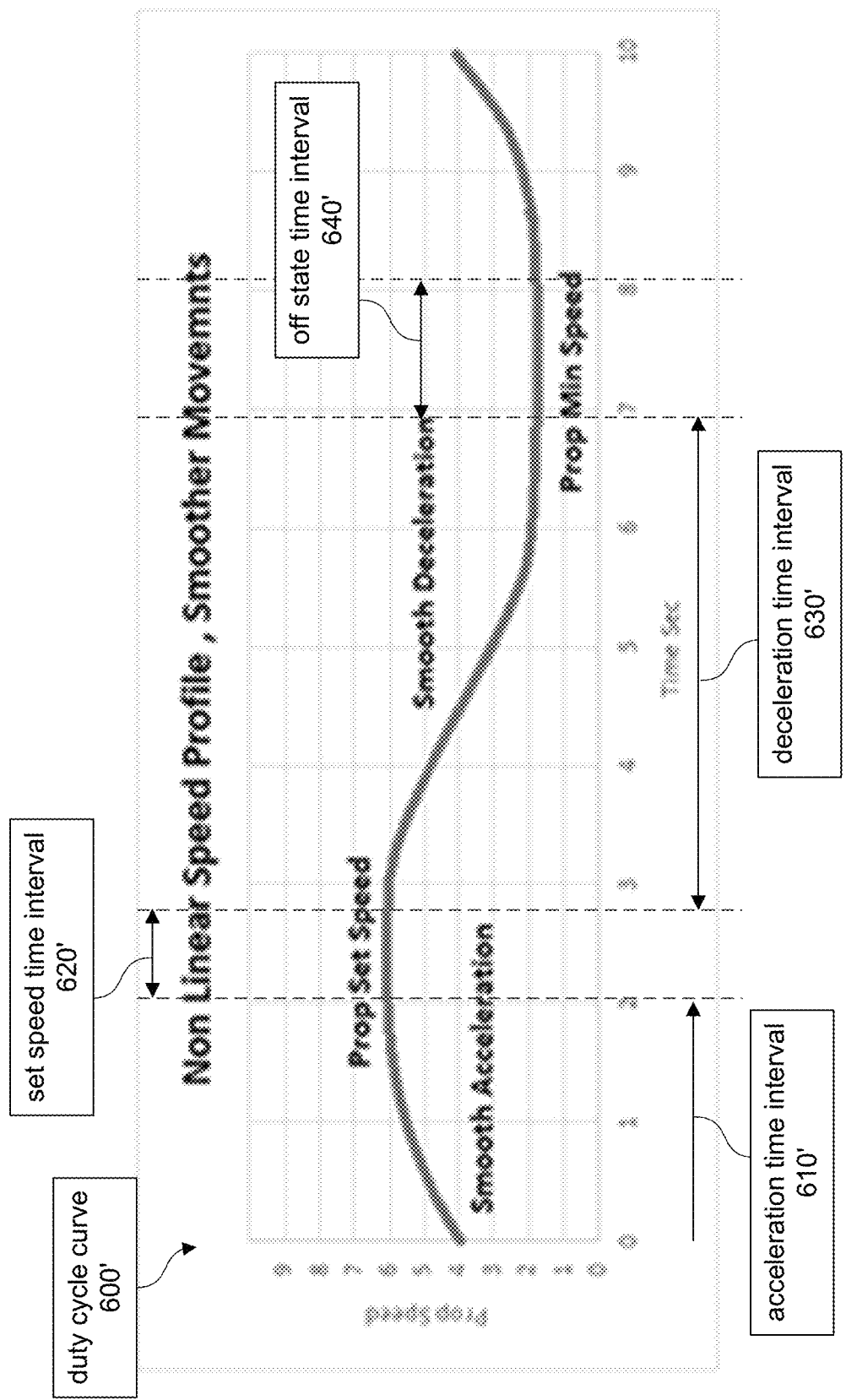
Figure 11:
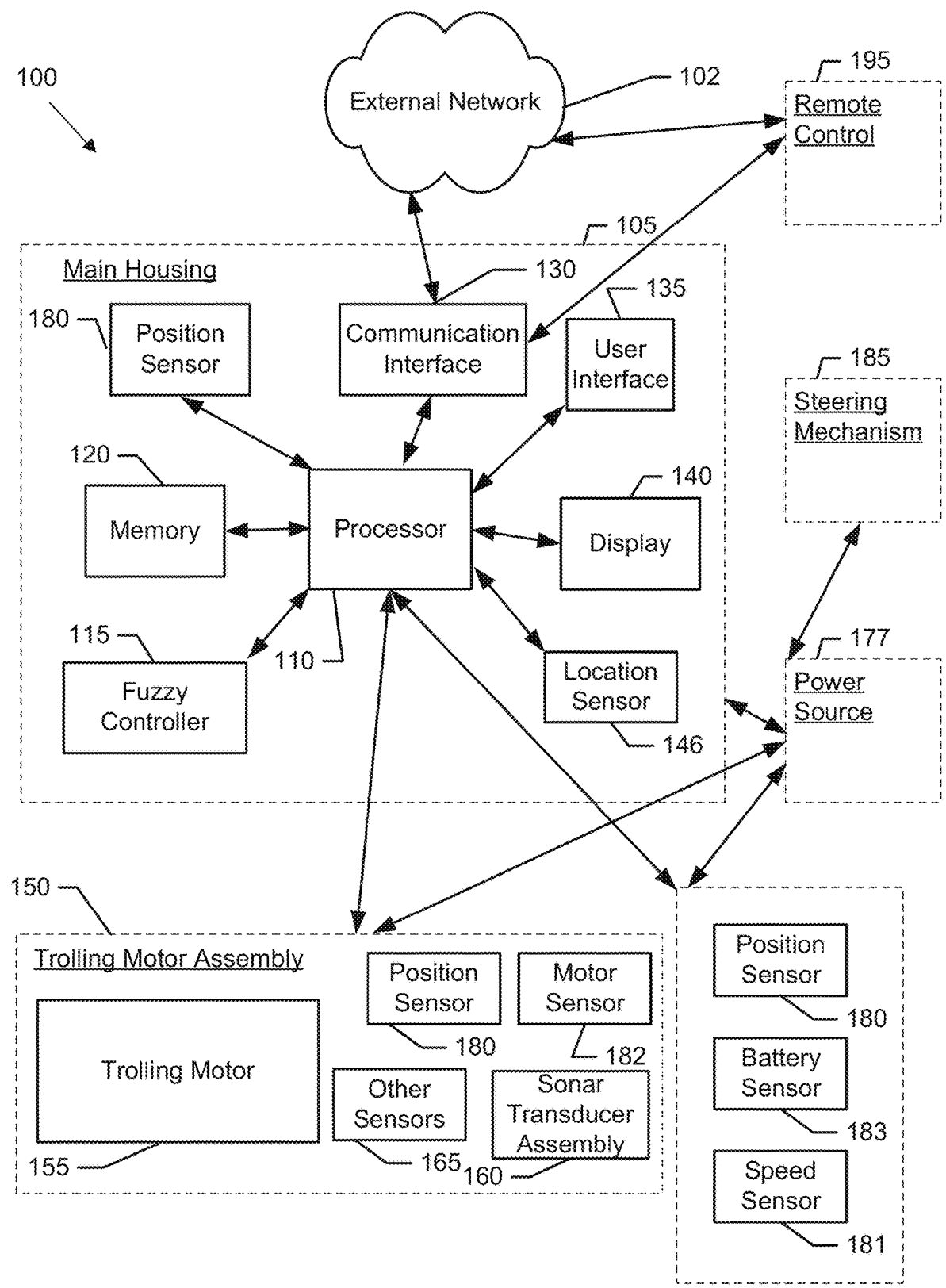
Figure 12:
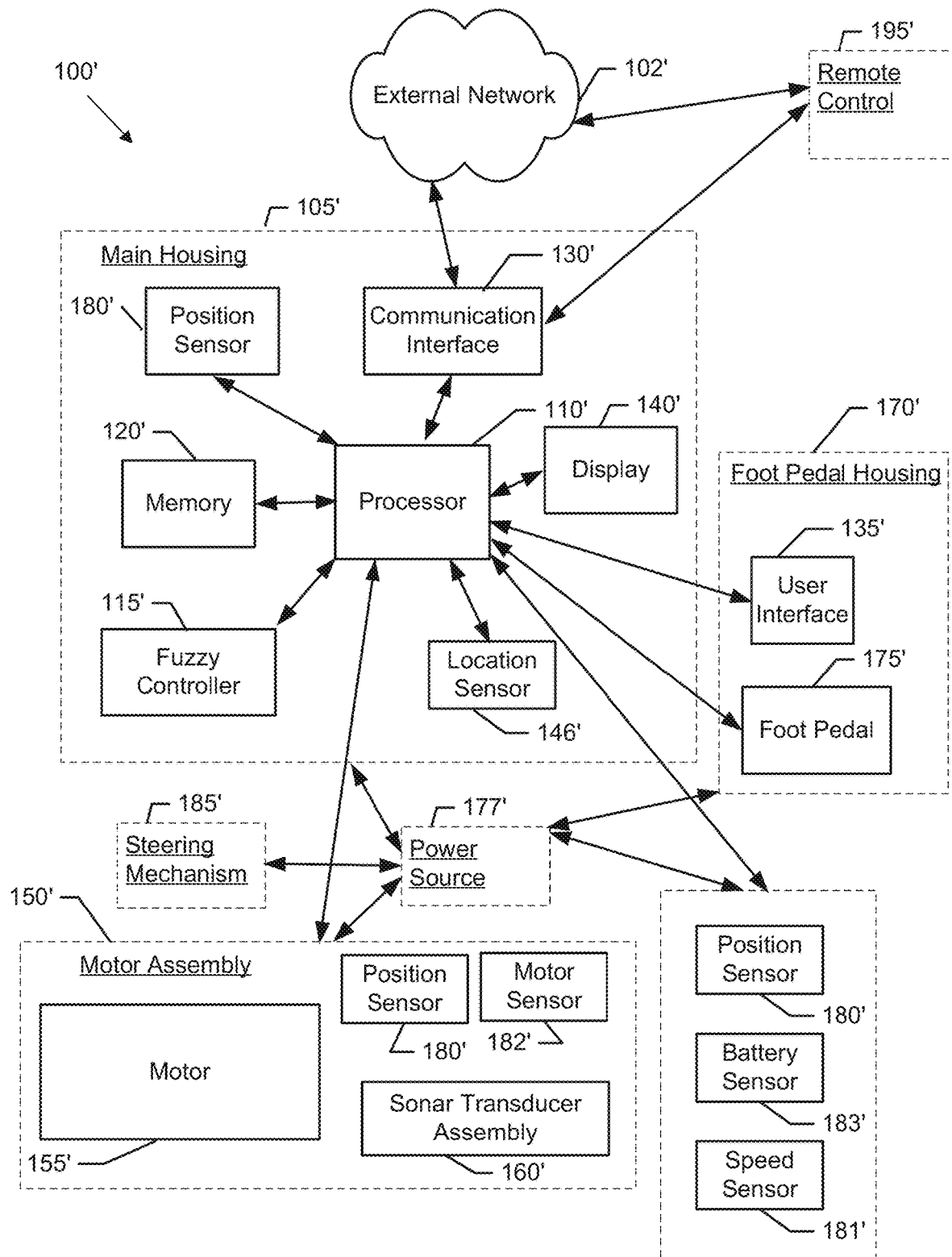
Figure 13:
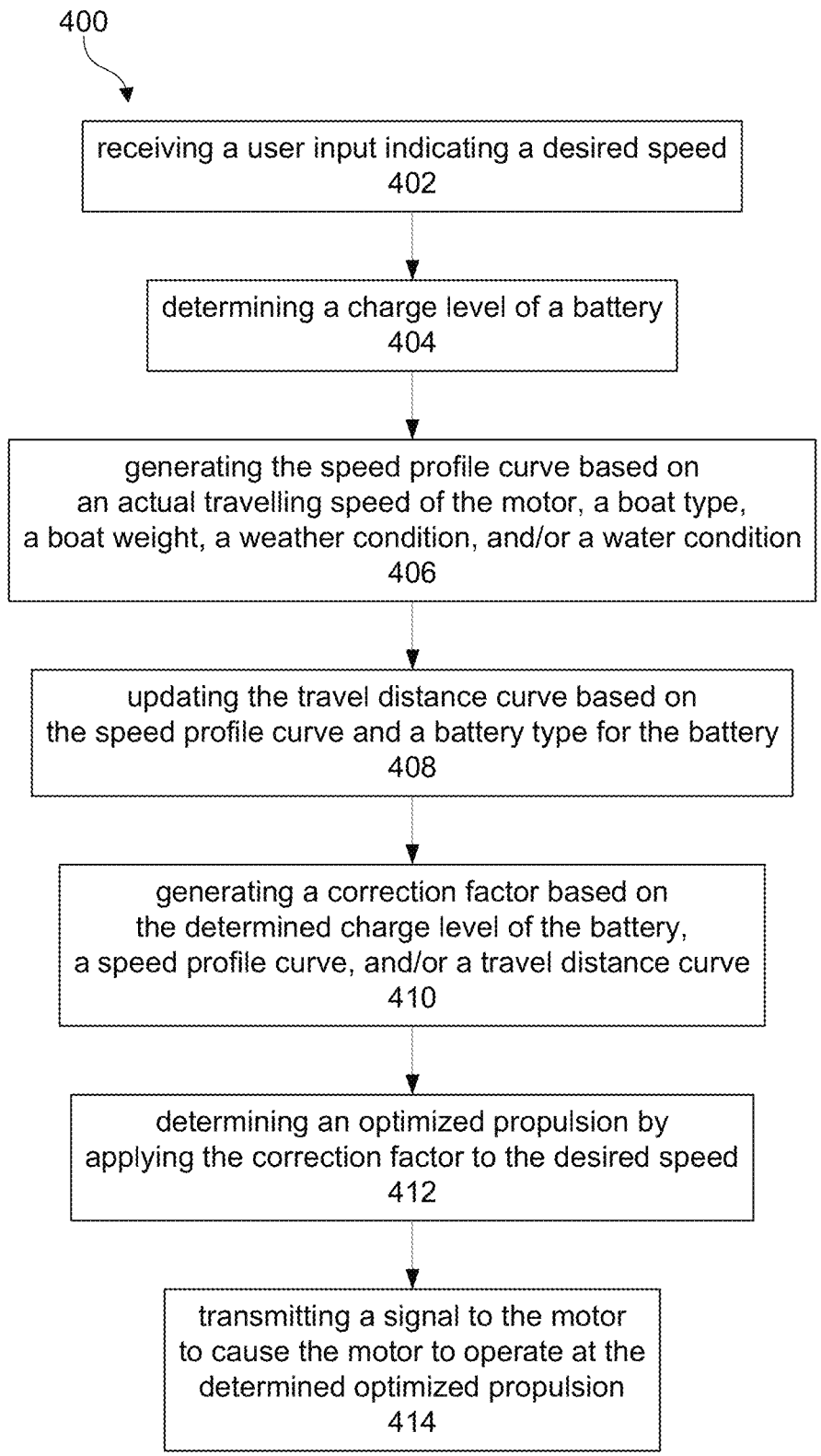

Having thus described embodiments of the present disclosure in general terms, reference will now be made to the accompanying drawings, which are not necessarily drawn to scale, and wherein:

FIG. 1 illustrates an example trolling motor assembly attached to a front of a watercraft, in accordance with some embodiments discussed herein;

FIG. 2 shows an example trolling motor assembly configured for hand-control, in accordance with some embodiments discussed herein;

FIG. 3 shows another an example trolling motor assembly that is configured for control via a foot pedal, in accordance with some embodiments discussed herein;

FIG. 4 shows an example fuzzy logic graph for determining an optimized speed of operation based on example voltages for a battery for a trolling motor system, in accordance with some embodiments discussed herein;

FIG. 5 shows an example speed profile curve and an example travel distance curve of a boat with a trolling motor system, in accordance with some embodiments discussed herein;

FIG. 6 shows an example normalized speed profile curve and example weighted travel distance curves used for finding a correction factor for a trolling motor system, in accordance with some embodiments discussed herein;

FIG. 7 shows an example closed loop for controlling the speed of operation of a trolling motor system, in accordance with some embodiments discussed herein;

FIG. 8 shows an example open loop for controlling the speed of operation of a trolling motor system, in accordance with some embodiments discussed herein;

FIG. 9 illustrates an example duty cycle curve for controlling the speed of operation of a trolling motor system, in accordance with some embodiments discussed herein;

FIG. 10 illustrates another example duty cycle curve for controlling the speed of operation of a trolling motor system, in accordance with some embodiments discussed herein;

FIG. 11 shows a block diagram illustrating an example trolling motor system including an example trolling motor assembly, in accordance with some embodiments discussed herein;

FIG. 12 shows a block diagram illustrating an example motor system, in accordance with some embodiments discussed herein; and FIG. 13 illustrates a flowchart of an example method for operating a motor, in accordance with some embodiments discussed herein.

DETAILED DESCRIPTION

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present disclosure provide marine motor systems and assemblies with a battery and performance optimization mode for improved operation. Such example embodiments enable a user to activate an eco-mode and set a desired speed, while letting the system determine an optimized speed profile based on battery charge, actual speed, motor output, and/or other marine data. This provides advantages in equipment and time saving. For example, a user may not have to recharge the battery of the motor for as long and, thus, may head out onto the water faster to fish or engage in other marine activities, for example.

FIG. 1 illustrates an example watercraft 10 on a body of water 15. The watercraft 10 has a trolling motor assembly 20 attached to its front, with a trolling motor 50 submerged in the body of water. The trolling motor can be used as a propulsion system to cause the watercraft to travel along the surface of the water. While the depicted embodiment shows the trolling motor assembly 20 attached to the front of the watercraft 10 and as a secondary propulsion system, example embodiments described herein contemplate that the trolling motor assembly 20 may be attached in any position on the watercraft 10 and/or may be the primary propulsion system for the watercraft 10.

Depending on the design, a trolling motor may be gas-powered or electric. Moreover, steering may be accomplished manually via hand control, via foot control, and/or through use of a remote control (e.g., multi-function display (MFD)). Additionally, in some cases, an autopilot may operate the trolling motor autonomously. Notably, however, some embodiments of the present disclosure contemplate use with an electric motor, such that a battery is used to provide power to the trolling motor and/or other components of the trolling motor (e.g., steering mechanism, display, etc.). Additionally, although a trolling motor is described in the majority of embodiments herein, various embodiments described herein are designed for us with other motors (e.g., outboard motors, inboard motors, etc.).

FIG. 2 illustrates an example trolling motor assembly 200 that is electric and hand controlled (e.g., such as the trolling motor system 100 shown in and described with respect to FIG. 11). The trolling motor assembly 200 includes a shaft 225 defining a first end 226 and a second end 227, a trolling motor housing 250 and a main housing 210.

The trolling motor housing 250 is attached to the second end 227 of the shaft 225 and at least partially contains a trolling motor that connects to a propeller 252. As shown in FIG. 1, in some embodiments, when the trolling motor assembly is attached to the watercraft and the trolling motor (or trolling motor housing) is submerged in the water, the trolling motor is configured to propel the watercraft to travel along the body of water. In addition to containing the trolling motor, the trolling motor housing may include other components described herein, including, for example, a sonar transducer assembly (e.g., the sonar transducer assembly 160 shown in and described with respect to FIG. 11) and/or other sensors (e.g., other sensors 165 shown in and described with respect to FIG. 11).

The main housing 210 is connected to the shaft 225 proximate the first end 226 of the shaft 225 and includes a hand control rod 218 that enables control of the trolling motor by a user (e.g., through angular rotation). As shown in FIG. 1, in some embodiments, when the trolling motor assembly is attached to the watercraft and the trolling motor (or trolling motor housing) is submerged in the water, the main housing is positioned out of the body of water and visible/accessible by a user. The main housing 210 may be configured to house components of the trolling motor assembly, such as may be used for processing marine or sensor data and/or controlling operation of the trolling motor, among other things. For example, with reference to FIG. 11, depending on the configuration and features of the trolling motor assembly, the main housing 210 may contain, for example, one or more of a processor 110, fuzzy controller 115, memory 120, location sensor 146, position sensor 180, communication interface 130, user interface 135, power supply 177, or a display 140.

The trolling motor assembly 200 may also include an attachment device 228 (e.g., a clamp or other attachment means) to enable connection or attachment of the trolling motor assembly to the watercraft. Depending on the attachment device used, the trolling motor assembly may be configured for rotational movement relative to the watercraft, including, for example, 360 degree rotational movement.

FIG. 3 illustrates an example trolling motor assembly 300 that is electric and controlled with a foot pedal (e.g., such as in the motor system 100' shown in and described with respect to FIG. 12). The trolling motor assembly 300 includes a shaft 325 defining a first end 326 and a second end 327, a trolling motor housing 350 and a main housing 310.

The trolling motor housing 350 is attached to the second end 327 of the shaft 325 and at least partially contains a trolling motor that connects to a propeller 352. As shown in FIG. 1, in some embodiments, when the trolling motor assembly is attached to the watercraft and the trolling motor (or trolling motor housing) is submerged in the water, the trolling motor is configured to propel the watercraft to travel along the body of water. In addition to containing the trolling motor, the trolling motor housing may include other components described herein, including, for example, a sonar transducer assembly (e.g., the sonar transducer assembly 160' shown in and described with respect to FIG. 12) and/or other sensors (e.g., the other sensors 165' shown in and described with respect to FIG. 12).

The main housing 310 is connected proximate the first end 326 of the shaft 325. As shown in FIG. 1, in some embodiments, when the trolling motor assembly is attached to the watercraft and the trolling motor (or trolling motor housing) is submerged in the water, the main housing is positioned out of the body of water and visible/accessible by a user. The main housing 310 may be configured to house components of the trolling motor assembly, such as may be used for processing marine data and/or controlling operation of the trolling motor, among other things. For example, with reference to FIG. 12, depending on the configuration and features of the trolling motor assembly, the main housing 310 may contain, for example, one or more of a processor 110', fuzzy controller 115', memory 120', location sensor 146', position sensor 180', power supply 177', or communication interface 130'.

The trolling motor assembly 300 also includes a foot pedal housing 370 that is electrically connected to the trolling motor (such as through the main housing 310) using the cable 372 (although the foot pedal may be wirelessly connected). The foot pedal housing 370 contains a foot pedal (e.g., the foot pedal 175' shown in and described with respect to FIG. 12) that enables a user to steer and/or otherwise operate the trolling motor to control the direction and speed of travel of the watercraft. The foot pedal housing 370 may also contain, in accordance with some embodiments, a display (e.g., the display 140' shown in and described with respect to FIG. 12) and/or user interface (e.g., the user interface 135' shown in and described with respect to FIG. 12). Further, depending on the configuration of the foot pedal, the foot pedal housing 370 (and/or main housing 310) may comprise an electrical plug 373 that can be connected to an external power source (e.g., the power source 177' shown in and described with respect to FIG. 12) for powering the various components of the trolling motor assembly 300.

The trolling motor assembly 300 may also include an attachment device, such as a clamp, mount, etc., (not shown) to enable connection or attachment of the trolling motor assembly to the watercraft. Depending on the attachment device used, the trolling motor assembly may be configured for rotational movement relative to the watercraft, including, for example, 360 degree rotational movement.

The speed or propulsion of a motor may be measured by the rotational speed or revolutions per minute (RPM) of the propeller, the thrust or propulsive force applied by the propeller, and/or the power needed to produce the thrust. The thrust may be described as the force applied by the propeller in a direction perpendicular to a line normal to the surface of a body of water. The power of the motor may be described as the power needed to generate the propulsive force or thrust of the propeller. The thrust and power of a motor are related to the speed and propulsion of the motor—and vice versa. As used herein, the set or operating speed or propulsion of a motor may encompass rotational speed, thrust, propulsive force, and/or power.

A trolling motor system (e.g., trolling motor system 100 shown in and described with respect to FIG. 11) may include a trolling motor assembly (e.g., trolling motor assembly 150 shown in FIG. 11), a processor (e.g., processor 110 shown in FIG. 11), and a memory (e.g., memory 120 shown in FIG. 11). The trolling motor assembly may include a propulsion motor (e.g., trolling motor 155 shown in FIG. 11) and a battery. The processor may send and/or receive signals from the trolling motor assembly. For example, the processor may generate and send an electrical signal to the trolling motor assembly indicating a speed at which the propulsion motor should operate.

The processor may be configured to receive one or more user inputs (e.g., via an MFD, hand control, foot control, such as via a speed wheel or other speed indicator). The user inputs may include a desired operating speed.

In some embodiments, the user inputs may indicate a selected mode for operating the marine motor. The selected mode may be selected by the user based on a plurality of modes of operation available for the trolling motor system. In some embodiments, the available modes may include a normal mode and an eco-mode, discussed in further detail below. Other modes are contemplated, such as non-optimized modes (e.g., turbo mode, sport mode, etc.), optimized modes (e.g., partial-eco-mode, smart mode, etc.), and other intermediate modes. Alternatively, in some embodiments, the motor system may operate in only one mode, such that the main or normal mode of operation is the described eco-mode.

In some embodiments, while operating in eco-mode, the processor may determine an optimized propulsion or speed based on a battery charge level and a desired operating speed input by the user. The battery charge level may be measured by a battery sensor (e.g., the battery sensor 183 shown in and described with respect to FIG. 11) in communication with the battery (e.g., the power supply 177 as shown in and described with respect to FIG. 11). The optimized propulsion or speed may be generated by applying a correction factor (e.g., 206a in FIG. 6) to the desired operating speed input by the user.

In some embodiments, the memory of the trolling motor system may determine and/or store a speed profile curve (e.g., 202 in FIG. 5) for the trolling motor system. The speed profile curve may be based on input and/or collected data about the power consumption of the propulsion motor across a range of speeds. The speed profile curve (e.g., 202 in FIG. 5) may be updated based on a boat type, a boat weight, a weather condition, and/or a water condition, any of which may be measured by connected sensors, gathered from an external network, or input by the user, for example.

In some embodiments, the processor may determine and/or store a travel distance curve (e.g., 204 in FIG. 5) based on the speed profile curve (e.g., 202 in FIG. 5) and a battery type for the battery. In some embodiments, the travel distance curve may be predetermined and stored in the memory.

In some embodiments, the speed profile curve (e.g., 202 in FIG. 5) and travel distance curve (e.g., 204 in FIG. 5) may be updated in real time based on the battery charge level and an actual travelling speed, which may, in some embodiments, be measured by a speed sensor (e.g., the speed sensor 181 shown in and described with respect to FIG. 11) or position sensor (e.g., the position sensor 180 shown in and described with respect to FIG. 11).

The processor may include a fuzzy controller (e.g., the fuzzy controller 115 shown in and described with respect to FIG. 11). In some embodiments, the fuzzy controller may determine and/or generate the correction factor (e.g., 206a in FIG. 6), such as based on the battery charge level of the battery. In some embodiments, the battery charge level (e.g., battery voltage) of the battery may be determined and converted to a fuzzy set. The conversion to a fuzzy set may be based on the nearness or degree of membership of the value of the battery charge level to one of a predetermined number of fuzzy sets. For example, the fuzzy controller may determine that a 91% charge should be considered a 100% charge, while an 89% charge should be considered an 80% charge, depending on the fuzzy logic rules set up. In this way, the continuum of battery charge levels can be broken down into a predetermined group of discrete levels.

FIG. 4 shows a fuzzy logic graph for determining an optimized speed of operation based on example voltages for a battery for a trolling motor system. In the illustrated graph, fuzzy sets of various states of the battery charge level of the battery including 0% (e.g., Discharged), 20% (Level 1), 40% (Level 2), 60% (Level 3), 80% (Level 4), and 100% (e.g., Fully Charged) are shown. Other input variables (e.g., boat speed, motor power) may also be determined (such as from various sensors, as described herein) and converted to fuzzy sets. For example, fuzzy sets of various boat speed levels may include Slow, Medium, Fast, and Very Fast. As another example, fuzzy sets of various motor power levels may include Low, Medium, High, and Very High. Each may correspond with their own percentage of a range of levels, such as with the battery charge level example. In some embodiments, the fuzzy sets may be predetermined and stored in the memory. Additionally or alternatively, in some embodiments, the fuzzy sets may be determined by the processor, such as dynamically and/or based on various factors (e.g., the battery type changes, the motor type changes, etc.).

FIG. 5 shows an example of the speed profile curve 202 and the travel distance curve 204 of a boat with a trolling motor system. The speed profile curve 202 and the travel distance curve 204 may be considered a knowledge database of the trolling motor system with respect to operating the propulsion motor at various optimized speeds. As seen in the example speed profile curve 202 of FIG. 5, the trolling motor system may operate less efficiently as the speed increases (e.g., the trolling motor system may operate less efficiently at speeds over 4.5 km/h due to the associated power consumption for higher speeds being 800 Watts or more).

The speed profile curve 202 may be updated in real time to represent the rate of decrease of the battery charge level versus the actual travelling speed of the boat. For example, if the boat is lighter or if wind/water conditions are favorable, then the actual travelling speed of the boat may be higher than it would be otherwise. So, the speed profile curve 202 may be scaled (e.g., higher or lower) to match the real time conditions of the boat. The speed profile curve 202 at known initial conditions may be stored in the memory. The processor may update and/or scale the speed profile curve 202 stored in the memory based on real time conditions.

Using the speed profile curve 202, the power consumption in Watts at any given speed (e.g., at time, t) may be used with the battery type 112 (ah·V) to find the hours remaining on the charge of the battery with the following equations:

$$ah \cdot V = W(t) \cdot h$$

$$\text{Time}(h) = \frac{\text{Battery Type}(ah \cdot V)}{\text{Power Consumption at } v(t) \text{ in Watts}}$$

where W(t) is the power consumption at speed v(t) in Watts, h is the time remaining on the charge of the battery in hours, and ah·V is the battery type (e.g., 36V, 100 Ah). The battery type may be entered by the user, determined by the processor and/or stored in memory.

Using the time remaining on the charge of the battery and the speed (e.g., at time, t) in km/h, the travel distance in km may be calculated with the following equation:

$$\text{Travel Distance} = \text{Time}(h) \cdot v(t)$$

where v(t) is the speed at time, t, in km/h and h is the time remaining on the charge of the battery in hours. In some embodiments, the processor may derive and/or update the travel distance curve 204 from the speed profile curve 202 in this manner across the range of speeds given in the speed profile curve 202.

In some embodiments, the processor may determine the correction factor 206, such as using the speed profile curve 202 and the travel distance curve 204. The processor may normalize the speed profile curve 202 and scale and/or weight the travel distance curve 204. In some embodiments, the processor may weight the travel distance curve 204 based on the battery charge level of the battery, such as using logic sets (e.g., the logic sets described with respect to FIG. 4).

FIG. 6 shows an example normalized speed profile curve 202', such as may be determined by the processor (e.g., generated, gathered from memory, etc.). In some embodiments, the processor may generate a weighted travel distance curve at 100% battery charge level 204a'. For example, the travel distance curve 204a' at 100% battery charge level may be weighted 100% or by 1. As another example, the travel distance curve 204b' at 60% may be weighted 60% or by 0.6. The processor may use the point at which the weighted travel distance curve at 100% battery charge level 204a' crosses the normalized speed profile curve 202' to determine a correction factor 206a (e.g., for determining an optimized propulsion speed for the motor). In some embodiments, the fuzzy controller may be used to determined and/or generate the various curves and correction factor, such as using fuzzy logic sets as described herein.

FIG. 6 also shows a weighted travel distance curve at 60% battery charge level 204b', from which a correction factor 206b may be derived. The generated correction factor 206 may be applied to the desired operating speed to determine the optimized propulsion speed for the motor. For example, the desired operating speed set by the user may be a maximum of 5.8 km/h. In normal mode, the processor may generate and transmit to the propulsion motor the electrical signal indicating that the propulsion motor should operate at the maximum desired operating speed. However, in eco-mode, the processor may generate and transmit to the propulsion motor the electrical signal indicating that the propulsion motor should operate at the optimized propulsion or speed.

In some embodiments, the processor may determine the optimized propulsion for the motor by applying the correction factor to the desired operating speed. For example, from FIG. 6, the correction factor 206a is 0.91 when the battery charge level is near full charge level. The processor may apply (e.g., by multiplying) the correction factor 206a to the desired operating speed of 5.8 km/h to get the optimized propulsion corresponding to a speed of 5.6 km/h. Alternatively, the processor may determine from the fuzzy logic set that the battery charge level is at the 60% level and apply the correction factor 206b of 0.53 to the desired operating speed to get 4.7 km/h as the optimized propulsion. In some embodiments, the processor may continually cycle through this process at set intervals and/or based on user input triggers to cause the propulsion motor to operate according to the optimized propulsion for the motor based on real time data.

In some embodiments, the system may be configured to temporarily interrupt the eco-mode operation of the motor system. For example, to avoid an object or other hazard, the user may wish to quickly turn and/or propel the watercraft at full speed. The motor system may include a turbo mode button or switch to enable the eco-mode operation to be disrupted in order to operate the propulsion motor at full speed. For example, the turbo mode button may be located on a hand control of the motor system. As another example, the turbo mode button may be located on a user input display (e.g., remote control, MFD). When the turbo mode button is selected, a turbo mode signal may be received by the processor. In response to this turbo mode signal, the processor may cause the propulsion motor to operate at the desired operating speed and/or the maximum operating speed. Additionally or alternatively, the turbo mode signal may be sent to the processor based on the user's activity (e.g., repeatedly turning a control to full speed). In such an example embodiment, the processor may determine that the turbo mode should be engaged, such as to satisfy a user. For example, the user may be exhibiting behavior indicative of being frustrated that the motor system is not operating at a desired speed (e.g., the user is repeatedly trying to increase the speed of operation—although other user input patterns or types are contemplated, such as quick turning, quick acceleration after a deceleration on a set speed, increased pressure being applied, etc.).

FIG. 7 shows an example closed loop 500 for the trolling motor system (e.g., trolling motor system 100 shown in FIG. 11). In some embodiments, the user may indicate to the processor 510 the desired operating speed or propulsion and a selected mode via a hand control 520 (e.g., speed, power, or thrust knob). The trolling motor assembly 550 may transmit data (e.g., the actual travelling speed of the boat 551, the battery charge level 552, the motor power 553, etc.) to the processor 510. The processor 510 may use a knowledge database 530 including estimated and measured curves and/or tables (e.g., speed profile curve 202, travel distance curve 204) to generate and transmit a speed profile 560 to the trolling motor assembly 550 to cause the propulsion motor (e.g., trolling motor 155 shown in FIG. 11) to operate at the optimized propulsion. In some embodiments, the trolling motor assembly 550 may transmit its operating speed 560 (e.g., the optimized propulsion) back to the hand control 520 (e.g., speed, power, or thrust knob) and/or other user input assembly. The signal indicating the operating speed 560 (e.g., optimized propulsion) may undergo gain 570 and/or other filtering. In some embodiments, the signal indicating the operating speed 560 (e.g., optimized propulsion) may cause the hand control 520 and/or other user input assembly to indicate the current operating speed (e.g., optimized propulsion) as the set speed, rather than the desired operating speed initially input by the user.

FIG. 8 shows an example block diagram of an open loop 500' for the trolling motor system (e.g., trolling motor system 100 shown in FIG. 11). The open loop 500' may operate similarly to the closed loop 500 system of FIG. 7, except that the hand control 520' (e.g., speed knob) or other user input assembly may indicate the previous set speed 580', rather than receive the updated operating speed 560' from the trolling motor assembly 550'.

In some embodiments, the motor system may be configured to operate according to a determined duty cycle curve (e.g., 600 in FIG. 9). By utilizing a duty cycle, the motor system may provide for a desirable user experience and save power at the same time. Further, such a mode of operation may be beneficial for certain marine activities, such as trolling. The processor may determine the duty cycle curve based on the desired speed and the determined charge level of the battery. In some embodiments, the user may select to operate according to one or more duty cycles. In some embodiments, the user may determine or set duty cycles and even create fast access key codes to cause quick selection of a specific duty cycle for operating the motor.

FIG. 9 shows an example duty cycle curve 600. The duty cycle curve 600 may include an acceleration time interval 610 indicating how long the trolling motor should spend accelerating from a minimum speed to the desired speed. The duty cycle curve 600 may include a set speed time interval 620 indicating how long the trolling motor should spend operating at the desired speed before decelerating. The duty cycle curve 600 may include a deceleration time interval 630 indicating how long the trolling motor should spend decelerating from the desired speed to the minimum speed. The minimum speed may be 0 km/h and/or correspond to an off state of the trolling motor. The duty cycle curve 600 may include an off state time interval 640 indicating how long the trolling motor should spend operating in the off state before accelerating.

FIG. 10 shows another example duty cycle curve 600' with smoother transitions between different speed regions. The curvatures for the duty cycle curve 600' may be customized by the user and/or included with software updates to the trolling motor system 500. The duty cycle curve 600' may include an acceleration time interval 610' indicating how long the trolling motor should spend accelerating from a minimum speed to the desired speed. The duty cycle curve 600' may include a set speed time interval 620' indicating how long the trolling motor should spend operating at the desired speed before decelerating. The duty cycle curve 600' may include a deceleration time interval 630' indicating how long the trolling motor should spend decelerating from the desired speed to the minimum speed. The minimum speed may be 0 km/h and/or correspond to an off state of the trolling motor. The duty cycle curve 600' may include an off state time interval 640' indicating how long the trolling motor should spend operating in the off state before accelerating.

The processor may determine the duty cycle curve 600 based on one or more of an actual travelling speed, a boat type, a boat weight, a weather condition, a water condition, and a current of the trolling motor.

Example System Architecture

FIG. 11 shows a block diagram of an example trolling motor system 100 capable for use with several embodiments of the present disclosure (although embodiments of the present disclosure contemplate use for any components herein as a generic motor, such as is consistent with embodiments described herein). As shown, the trolling motor system 100 may include a number of different modules or components, each of which may comprise any device or means embodied in either hardware, software, or a combination of hardware and software configured to perform one or more corresponding functions. For example, the trolling motor system 100 may include a main housing 105 and a trolling motor assembly 150.

The main housing 105, remote control, and/or user interface display may include a processor 110, a fuzzy controller 115, a memory 120, a communication interface 130, a user interface 135, a display 140, and one or more sensors (e.g., location sensor 146, a position sensor 180, a speed sensor 181, a motor sensor 182, and a battery sensor 183).

In some embodiments, the trolling motor system 100 may be configured such that the one or more processors electrically control the trolling motor in addition to the features described herein. This forms a compact and integrated system.

In some embodiments, the trolling motor system 100 may be configured to receive, process, and display various types of marine data. In some embodiments, the trolling motor system 100 may include one or more processors 110 and a memory 120. Additionally, the trolling motor system 100 may include one or more components that are configured to gather marine data or perform marine features. In such a regard, the processor 110 may be configured to process the marine data and generate one or more images corresponding to the marine data for display on the screen that is integrated in the trolling motor assembly. Further, the trolling motor system 100 may be configured to communicate with various internal or external components (e.g., through the communication interface 130), such as to provide instructions related to the marine data. Though depicted as being contained in one or more of the main housing, trolling motor housing, or foot pedal housing, the various components described herein can be contained in any one of the various (or other) housings within the trolling motor assembly.

The processor 110 (which may include, for example, a fuzzy controller 115) may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide display data to the display to indicate the direction of the trolling motor housing relative to the watercraft.

In some example embodiments, the processor 110 may be configured to receive sonar data indicative of the size, location, shape, etc. of objects detected by the system 100. For example, the processor 110 may be configured to receive sonar return data and process the sonar return data to generate sonar image data for display to a user (e.g., on display 140 or a remote display). In some embodiments, the processor 110 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 110 may further implement notices and/or alarms (e.g., alerts determined or adjusted by a user) to reflect depth measurements, the presence of fish, the proximity of other watercraft, status or notifications for peripheral devices/systems, etc. The processor 110 and memory 120 may form processing circuitry.

The memory 120 may be configured to store instructions, computer program code, marine data (e.g., sonar data, chart data, location/position data), and/or other data associated with the trolling motor system 100 in a non-transitory computer readable medium for use by the processor, for example.

The trolling motor system 100 may also include one or more communications modules configured to communicate via any of many known manners, such as via a network, for example. The processing circuitry and communication interface 130 may form a processing circuitry/communication interface. The communication interface 130 may be configured to enable connections to external systems (e.g., an external network 102 or one or more remote controls 195, such as a handheld remote control, MFD, foot pedal, or other remote computing device). In this regard, the communication interface (e.g., 130) may include one or more of a plurality of different communication backbones or frameworks, such as Ethernet, USB, CAN, NMEA 2000, GPS, Sonar, cellular, WiFi, and/or other suitable networks, for example. In this manner, the processor 110 may retrieve stored data from a remote, external server via the external network 102 in addition to or as an alternative to the onboard memory 120. The network may also support other data sources, including GPS, autopilot, engine data, compass, radar, etc. Numerous other peripheral, remote devices such as one or more wired or wireless multi-function displays may be connected to the trolling motor system 100.

The processor 110 may configure the device and/or circuitry to perform the corresponding functions of the processor 110 as described herein. In this regard, the processor 110 may be configured to analyze electrical signals communicated thereto to provide, for example, various features/functions described herein.

In some embodiments, the trolling motor system 100 may be configured to determine the location of the watercraft, such as through position sensor 180. Accordingly, the processor (such as through execution of computer program code) may be configured to receive the marine data from the position sensor, process the marine data to generate an image including a chart with the location from the position sensor, and cause the screen to display the image. Accordingly, the display 140 and/or user interface 135 may be configured to display the image including the chart.

The position sensor 180 may be configured to determine the current position and/or location of the main housing 105. For example, the position sensor 180 may comprise a GPS or other location detection system. The position sensor 180 may be found in one or more of the main housing 105, the trolling motor assembly 150, or remotely. In some embodiments, the position sensor 180 may be configured to determine a direction of which the trolling motor housing is facing. In some embodiments, the position sensor 180 may be operably coupled to either the shaft 225, 325 or steering mechanism 185, such that the position sensor 180 measures the rotational change in position of the trolling motor assembly 150 as the trolling motor is turned. The position sensor 180 may be a magnetic sensor, a light sensor, mechanical sensor, or the like.

In some embodiments, the trolling motor system 100 may be configured to determine the location of the watercraft, such as through location sensor 146. The trolling motor system 100 may comprise, or be associated with, a navigation system that includes the location sensor 146. For example, the location sensor 146 may comprise a GPS, bottom contour, inertial navigation system, such as a micro-electro-mechanical system (MEMS) sensor, a ring laser gyroscope, or the like, or other location detection system. In such a regard, the processor 110 may be configured to act as a navigation system. For example, the processor 110 may generate at least one waypoint and, in some cases, generate an image of a chart along with the waypoint for display by the screen. Additionally or alternatively, the processor may generate one or more routes associated with the watercraft. The location of the vessel, waypoints, and/or routes may be displayed on a navigation chart on a display remote from the trolling motor system 100. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 140 and/or user interface 135 may be configured to display images associated with vessel or motor status (e.g., gauges) or other marine data.

In any of the embodiments, the display 140 may be configured to display an indication of the current direction of the trolling motor assembly 150 relative to the watercraft.

The display 140 may be configured to display images and may include or otherwise be in communication with a user interface 135 configured to receive input from a user. The display 140 may be, for example, a conventional liquid crystal display (LCD), LED/OLED display, touchscreen display, mobile device, and/or any other suitable display known in the art, upon which images may be displayed. The display may be integrated into the main housing 105. In some example embodiments, additional displays may also be included, such as a touch screen display, mobile device, or any other suitable display known in the art upon which images may be displayed.

In some embodiments, the display 140 may present one or more sets of marine data and/or images generated therefrom. Such marine data may include chart data, radar data, weather data, location data, position data, orientation data, sonar data, and/or any other type of information relevant to the watercraft. In some embodiments, the display 140 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

In some embodiments, the display 140 and/or user interface may be a screen that is configured to merely present images and not receive user input. In other embodiments, the display and/or user interface may be a user interface such that it is configured to receive user input in some form. For example, the screen may be a touchscreen that enables touch input from a user. Additionally or alternatively, the user interface may include one or more buttons (not shown) that enable user input.

Additionally, the display may be configured to display other relevant trolling motor information including, but not limited to, speed data, motor data battery data, current operating mode, auto pilot, or the like. For example, in some example embodiments, the trolling motor system 100 may include a plurality of operating modes, such as a manual or normal mode, an eco-mode, an anchor mode, an autopilot mode, a speed lock mode, a heading lock mode, or the like. The processor 100 may receive an indication of the current operating mode and generate display data indicative of the current operating mode. In an example embodiment, the mode may be represented by a number, letter, or character value displayed, such as on the seven segment display. Additionally or alternatively, each mode may be represented by a mode icon. For example, a manual mode may be represented by a manual mode icon, such as a propeller, an eco-mode may be represented by an eco-mode icon, such as a leaf, a speed lock mode may be represented by a speed lock icon, such as a vessel outline with arrow, an anchor lock mode may be represented by an anchor lock icon, such as an anchor, and a heading lock mode may be represented by a heading lock icon, such as a vessel outline with a directional indicator.

In addition to the mode icons, other informational icons may also be provided. In an example embodiment, the digital display may include one or more of a speed icon, a battery icon, and a motor icon. These additional icons may be used to indicate the type of data displayed on the seven segment display. For example, no icon may be indicated when speed data is displayed, however, a battery icon or motor icon may be displayed to indicate battery data or motor data is being displayed, respectively.

The user interface 135 may include, for example, a keyboard, keypad, function keys, mouse, scrolling device, input/output ports, touch screen, or any other mechanism by which a user may interface with the system.

In some embodiments, the trolling motor system 100 may comprise an autopilot that is configured to operate the trolling motor to propel the watercraft in a direction and at a speed. In some embodiments, the autopilot may direct the watercraft to a waypoint (e.g., a latitude and longitude coordinate). Additionally or alternatively, the autopilot may be configured to direct the watercraft along a route, such as in conjunction with the navigation system. Further, additional autopilot features (e.g., anchoring) are also contemplated. In some example embodiment, the processor 110 may receive an indication of the trolling motor operating condition being the autopilot mode. The processor 110 may generate display data based on the autopilot operating mode and cause an indication of the autopilot operating mode to be displayed on the digital display in the first portion, such as an autopilot icon.

In some embodiments, the trolling motor system 100 may comprise a sonar system including a sonar transducer assembly 160. The sonar transducer assembly 160 may be housed in the trolling motor assembly 150 and configured to gather sonar data from the underwater environment relative to the watercraft. Accordingly, the processor 110 (such as through execution of computer program code) may be configured to receive an indication of operation of the sonar transducer assembly 160. The processor 110 may generate additional display data indicative of the operation of the sonar transducer and cause the display data to be displayed on the digital display. For example, a sonar icon (not shown) may be energized to indicate that the sonar transducer is operating.

In some embodiments, the sonar system may be used to determine depth and bottom topography, detect fish, locate wreckage, etc. Sonar beams, from a sonar transducer assembly, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

The trolling motor system 100 may include a steering mechanism 185 for steering the trolling motor 155. In some embodiments, the trolling motor system 100 may include use of a manually operated steering mechanism; however, in other embodiments, the trolling motor system 100 may use a motorized mechanism for steering, which may include use of a cable steer type trolling motor or an electric steer type trolling motor.

The trolling motor assembly 150 may include a trolling motor 155, a sonar transducer assembly 160, and one or more other sensors (e.g., motor sensor 182, position sensor 180, water temperature, current, etc.), which may each be controlled through the processor 110 (such as detailed herein).

In an example embodiment, the trolling motor system 100 may include a speed sensor 181, such as an electromagnetic speed sensor, paddle wheel speed sensor, or the like. The speed sensor 181 may be configured to measure the speed of the watercraft 10 through the water. The processor 110 may receive speed data from the speed sensor 181 and generate additional display data indicative of the speed of the watercraft 10 through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven digit display). The processor 110 may cause an LED associated with the appropriate unit for the speed data to be illuminated.

In some example embodiments, the trolling motor system 100 may include a motor sensor 182. The motor sensor may be a voltage sensor, a rotation per minute (RPM) sensor, a current sensor, or other suitable sensor to measure the output of the trolling motor 155. The processor 110 may receive the motor data from the motor sensor 182 and determine a motor output. In an example embodiment, the motor data may be compared to a data table (which may be stored in memory 120) to determine a motor output, such as a percentage of maximum motor output. The processor 110 may generate additional display data indicative of the motor output and cause the display data to be displayed in the first portion of the digital display. For example, the motor data may be the measured voltage, current, or RPM displayed in the display, a percentage of the maximum motor output displayed in the display or graphically in a segment bar, a high or low motor output warning light, or other suitable display. The segment bar may include a plurality of display segments which may be energized or de-energized to indicate a corresponding proportion of the maximum output of the motor.

In some embodiments, the trolling motor system 100 further includes a power source 177 (e.g., a battery) that is configured to provide power to the various components of the trolling motor assembly. In some embodiments, the power source 177 is rechargeable.

In some example embodiments, the trolling motor system 100 includes a battery sensor 183. The battery sensor 183 may include a current sensor or voltage sensor configured to measure the current charge of a battery power supply of the trolling motor system 100 (e.g., the power source 177). The battery sensor 183 may be configured to measure individual battery cells or measure a battery bank. The processor 110 may receive battery data from the battery sensor 183 and determine the remaining charge on the battery. In an example embodiment, the voltage or current measured by the battery sensor 183 may be compared to a reference value or data table, stored in memory 120, to determine the remaining charge on the battery.

In some embodiments, the trolling motor system 100 may include other sensors. For example, in some embodiments, the trolling motor system may include an accelerometer for measuring acceleration data, which may be logged by the processor. The acceleration data may be utilized for maintenance, warranties, accident investigation, and/or product data collection for quality control. In some embodiments, the trolling motor system may include an accelerometer, a gyroscope, and/or a magnetometer, which may be portions of a micro-electro-mechanical system (MEMS). In some embodiments, the accelerometer may be a variable capacitive (VC) MEMS accelerometer, a piezoresistive (PR) MEMS accelerometer, or the like. The gyroscope may be configured to measure angular velocity. In some embodiments, the gyroscope may be a vibrating structure MEMS gyroscope including gyroscopic sensors oriented in a plurality of axes. The magnetometer may be configured to measure magnetic field strength, which can be used to find magnetic north and/or heading angle. In some embodiments, the magnetometer may be a Lorentz force based MEMS sensor, electron tunneling MEMS sensor, MEMS compass, or the like.

FIG. 12 illustrates a block diagram of an example motor assembly 100' with a user interface 135' integrated within the foot pedal housing 170' capable for use with several embodiments of the present disclosure. The motor assembly 100' is similar to and includes many of the same components as the trolling motor system 100 shown in FIG. 11. Notably, however, different from the trolling motor system 100 of FIG. 11, the motor assembly 100' of FIG. 12 further includes a foot pedal housing 170' that includes a foot pedal 175' and a user interface 135', which may each be connected to the processor 110 (such as detailed herein).

Example Flowchart(s)

Embodiments of the present disclosure provide methods for operating a motor, such as a trolling motor. Various examples of the operations performed in accordance with embodiments of the present disclosure will now be provided with reference to FIG. 13.

FIG. 13 illustrates a flowchart according to an example method for operating a motor according to an example embodiment 400. The operations illustrated in and described with respect to FIG. 13 may, for example, be performed by, with the assistance of, and/or under the control of one or more of the processor 110/110', fuzzy controller 115/115', memory 120/120', communication interface 130/130', user interface 135/135', location sensor 146/146', display 140/140', sonar transducer assembly 160/160', position sensor 180, 180', speed sensor 181, 181', motor sensor 182, 182', battery sensor 183, 183', power source 117, 117', and/or other components described herein.

Operation 402 may comprise receiving a user input indicating a desired speed. The processor 110/110', fuzzy controller 115/115', memory 120/120', user interface 135, 135', position sensor 145/145', and/or sonar transducer assembly 160/160' may, for example, provide means for performing operation 402. Operation 404 may comprise determining a charge level of a battery. The processor 110/110', power source 117, 117', battery sensor 183, 183', and/or memory 120/120' may, for example, provide means for performing operation 404. Operation 406 may comprise generating the speed profile curve based on one or more of an actual travelling speed of the motor, a boat type, a boat weight, a weather condition, and a water condition. The processor 110/110', memory 120/192, user interface 135/135', and/or display 140/140' may, for example, provide means for performing operation 406. At operation 408, the method 400 may comprise updating the travel distance curve based on the speed profile curve and a battery type for the battery. The processor 110/110', memory 120/192, user interface 135/135', and/or display 140/140' may, for example, provide means for performing operation 408. At operation 410, the method 400 may comprise generating a correction factor based on at least one of the determined charge level of the battery, a speed profile curve, and a travel distance curve. The processor 110/110', memory 120/192, user interface 135/135', and/or display 140/140' may, for example, provide means for performing operation 410. At operation 412, the method 400 may comprise determining an optimized propulsion by applying the correction factor to the desired speed. The processor 110/110', memory 120/192, user interface 135/135', and/or display 140/140' may, for example, provide means for performing operation 412. At operation 414, the method 400 may comprise transmitting a signal to the motor to cause the motor to operate at the determined optimized propulsion. The processor 110/110', memory 120/192, communication interface 130, 130', user interface 135/135', and/or display 140/140' may, for example, provide means for performing operation 414.

FIG. 13 illustrates a flowchart of a system, method, and/or computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120/120' and executed by, for example, the processor 110/110' or fuzzy controller 115/115'. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the method for operating a motor may include additional, optional operations, and/or the operations described above may be modified or augmented.

CONCLUSION

Many modifications and other embodiments of the disclosures set forth herein will come to mind to one skilled in the art to which these present disclosures pertain having the benefit of the teachings presented in the foregoing descriptions and the associated drawings. Therefore, it is to be understood that the embodiments of the present disclosure are not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated within the scope of the present disclosure. Although specific terms are employed herein, they are used in a generic and descriptive sense only and not for purposes of limitation.

The invention claimed is:

1. A trolling motor system for use on a marine vessel, the trolling motor system comprising:
a trolling motor assembly comprising a propulsion motor and a battery, wherein the propulsion motor is variable speed and configured to operate at an optimized propulsion in response to an electrical signal;
a processor configured to:
determine the optimized propulsion based on one or more user inputs,
generate and transmit the electrical signal corresponding to the optimized propulsion to the propulsion motor; and
a memory configured to store a speed profile curve,
wherein the one or more user inputs include a desired operating speed and a selected mode,
wherein the selected mode is one of a normal mode and an eco-mode,
wherein, when the selected mode is the eco-mode, the processor determines the optimized propulsion based on the desired operating speed and a correction factor generated based on the speed profile curve and a battery charge level of the battery.

2. The trolling motor system of claim 1, wherein the correction factor is generated by a fuzzy controller.

3. The trolling motor system of claim 1, wherein the speed profile curve is updated based on one or more of an actual travelling speed of the trolling motor, a boat type, a boat weight, a weather condition, and a water condition.

4. The trolling motor system of claim 1, wherein the correction factor is generated based on a travel distance curve, wherein the travel distance curve is updated based on the speed profile curve and a battery type for the battery.

5. A motor system comprising:
a motor;
a battery; and
a processor configured to:
receive a user input indicating a desired speed,
determine a charge level of the battery,
determine an optimized propulsion based on the desired speed and the determined charge level of the battery, wherein the optimized propulsion is determined by applying a correction factor to the desired speed, wherein the correction factor is based on at least one of the determined charge level of the battery, a speed profile curve, and a travel distance curve, and
transmit a signal to the motor to cause the motor to operate at the determined optimized propulsion.

6. The motor system of claim 5, wherein the motor is a trolling motor.

7. The motor system of claim 5, wherein the correction factor is generated by a fuzzy controller.

8. The motor system of claim 5, further comprising:
a speed sensor configured to determine an actual travelling speed of the motor,
wherein the speed profile curve is updated based on the actual travelling speed of the motor measured by the speed sensor.

9. The motor system of claim 5, wherein the speed profile curve is based on one or more of a motor type, a haul weight, and an environmental condition.

10. The motor system of claim 5, wherein the travel distance curve is updated based on the speed profile curve and a battery type for the battery.

11. The motor system of claim 5, wherein in response to a turbo mode signal received by the processor, the processor is configured to transmit a turbo signal to the motor to cause the motor to operate at an increased speed.

12. The motor system of claim 11, wherein the increased speed is the desired speed.

13. The motor system of claim 11, wherein the turbo mode signal is transmitted to the processor based on a user activity.

14. The motor system of claim 5, wherein the user input is transmitted to the processor via a user input assembly.

15. The motor system of claim 14, wherein the user input assembly includes at least one of a foot pedal, a hand control, and a remote control.

16. A method of operating a trolling motor, the method comprising:
receiving a user input indicating a desired speed;
determining a charge level of a battery;
generating a correction factor based on at least one of the determined charge level of the battery, a speed profile curve, and a travel distance curve,
determining an optimized propulsion based on the desired speed and the charge level of the battery, wherein the optimized propulsion is determined by applying the correction factor to the desired speed; and
transmitting a signal to the trolling motor to cause the trolling motor to operate at the determined optimized propulsion.

17. The method of claim 16, further comprising:
generating the speed profile curve based on one or more of an actual travelling speed of the trolling motor, a boat type, a boat weight, a weather condition, and a water condition.

18. The method of claim 16, further comprising:
updating the travel distance curve based on the speed profile curve and a battery type for the battery.

19. A motor system comprising:
a motor;
a battery; and
a processor configured to:
receive a user input indicating a desired speed,
determine a charge level of the battery,
determine an optimized propulsion based on the desired speed and the determined charge level of the battery,
transmit a signal to the motor to cause the motor to operate at the determined optimized propulsion,
receive a second user input indicating initiation of a turbo mode, and
transmit, in response to the second user input, a turbo signal to the motor to cause the motor to operate at an increased speed.

20. The motor system of claim 19, wherein the increased speed is the desired speed.

* * * * *